Sept. 20, 1955   W. G. HARVEY   2,718,032
KNOCKOUT MECHANISM FOR MOLDING DIES
Filed Oct. 25, 1951   2 Sheets-Sheet 1

INVENTOR
WILFRED G. HARVEY
BY
ATTORNEY

Sept. 20, 1955 W. G. HARVEY 2,718,032
KNOCKOUT MECHANISM FOR MOLDING DIES
Filed Oct. 25, 1951 2 Sheets-Sheet 2

INVENTOR
WILFRED G. HARVEY
BY
ATTORNEY

United States Patent Office 2,718,032
Patented Sept. 20, 1955

2,718,032
KNOCKOUT MECHANISM FOR MOLDING DIES

Wilfred G. Harvey, Leominster, Mass.

Application October 25, 1951, Serial No. 253,167

5 Claims. (Cl. 18—42)

The present invention relates to dies or molds of the type that are employed in connection with injection molding machines for the molding of plastic articles which are ejected from one mold after the molding operation by movable ejector or knockout pins.

The object of the present invention is to provide an improved arrangement for returning the pins of a knockout mechanism which is in the nature of a safety device for preventing damage to the mold in which the pins normally operate, should the pins fail to be withdrawn from the molding cavity in the interval between opening of the dies to eject the molded article or articles and reclosure of the dies in advance of the next molding operation. The present invention has particular relation to molding dies of the type in which a core is positioned inside one of the molding cavities, prior to the molding operation, so that movement of the core would shear off the knockout pins and damage the molding cavity should the usual knockout mechanism fail to withdraw the pins before the reentry of the core into the molding cavity.

Briefly stated, the present invention resides in providing the conventional knockout mechanism of a pair of molding dies with a safety attachment cooperating with a movable molding core, which attachment permits operation of the knockout pins in the usual manner to eject a molded article upon opening of the dies, while positively withdrawing the pins from the molding cavity in advance of the reentry of the core, as the dies are closed in advance of a molding operation. As a result of the automatic functioning of my improved safety mechanism, in timed relation with opening and closing of the dies, it is impossible for the dies to be closed with the core in position, without the knockout pins being fully withdrawn from the molding cavity.

The above and other advantageous features of the invention will hereinafter more fully appear from the following description, considered in connection with the accompanying drawings, in which, Fig. 1 is a view in side elevation of an operating mechanism for molding dies embodying the present invention, with the dies in closed positon.

Figure 1:
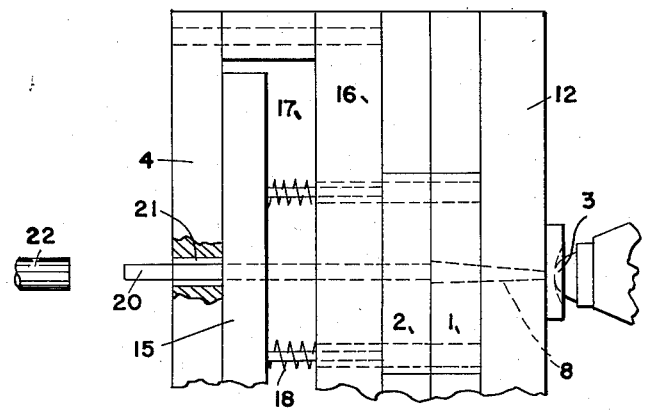

Referring to the drawings, the invention is shown for purposes of illustration in connection with the relatively movable molds or dies 1 and 2 of an injection molding machine of usual construction, which machine provides a suitable nozzle 3 for injecting plastic material into the dies 1 and 2 to form molded articles within molding cavities provided by the dies. As is usual in molding machines of this character, the die 1 is fixed while the die 2 is movable, for which purpose the die 2 is connected to an operating plate 4 which is adapted to be moved by suitable mechanism, not shown, to separate the dies 1 and 2 along their parting line when the plate 4 is moved from the position of Fig. 1 to the position of Fig. 2.

Figure 4:
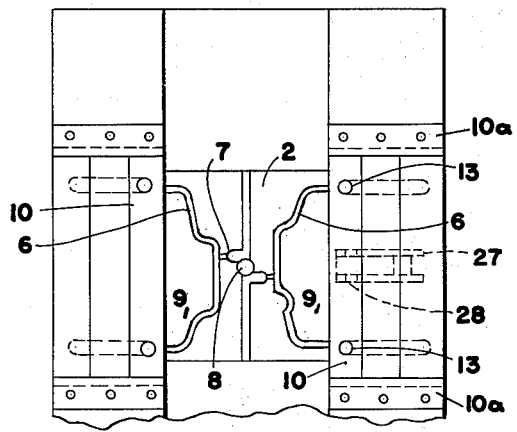
Fig. 4 is a view in front elevation of the movable die shown in Fig. 2 as viewed from the right.
Figure 3:
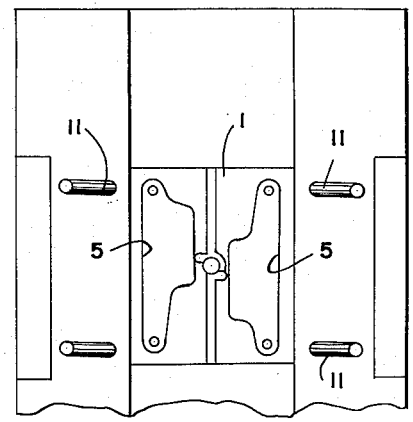
Fig. 3 is a view in front elevation of the fixed die shown in Fig. 2, as viewed from the left.

As best shown in Figs. 3 and 4, the dies 1 and 2 provide molding cavities 5 and 6 into which the plastic material from the nozzle 3 is injected, when the dies are closed, through suitable gates 7 in communication with the usual sprue-way 8 extending through the fixed die 1 from the nozzle 3. The cavities 5 and 6 are of any desired form, so that each mating pair is adapted to produce a molded article in cooperation with a suitable core 9. When the dies 1 and 2 are closed the core 9 is positioned within the molding cavities 5 and 6 so as to provide a space into which the plastic material is injected from the nozzle to produce a molded article A, as best shown in Fig. 5.

The core 9 is carried by a block 10 which is movable with the operating plate 4, while being slidably mounted on a pair of rods 11 extending from the fixed die plate 12 at opposite inclinations to the face thereof. These rods 11 are received in oppositely inclined openings 13 provided in the block 10 as best shown in Fig. 4, so that when the dies are opened by movement of the plate 4 from the position of Fig. 5 to the position of Fig. 6, the core 9 will be withdrawn from the molding cavity 6, with the sides of the block 10 moving between spaced ways 10a towards a guide 14 provided by the fixed die plate 12. This removal of the core 9 from the molding cavity 6 permits the molded article A to be ejected by means of a knockout mechanism which will next be described.

Figure 5:
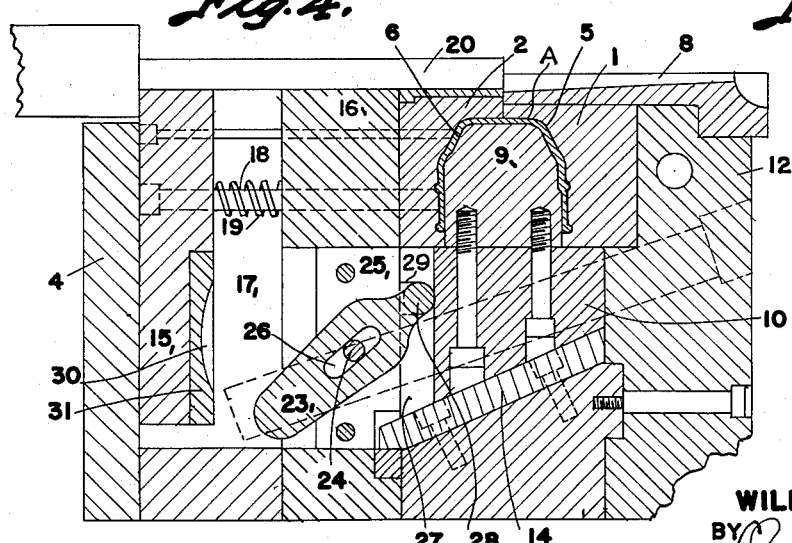
Fig. 5 is a large scale fragmentary sectional view, substantially in the horizontal plane of the sprue-way to the molding cavity, and showing the dies in closed position.
Figure 2:
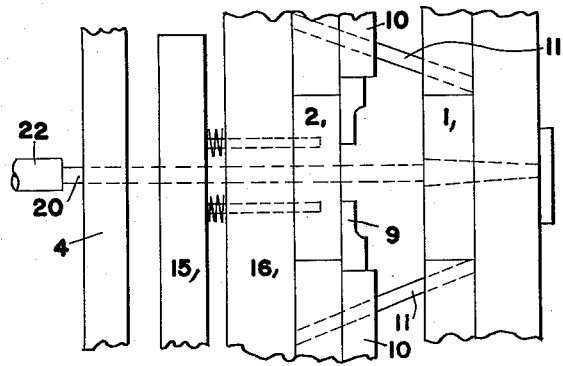
Fig. 2 is a plan view of the mechanism of Fig. 1, with the dies in open position.

As best shown in Figs. 1 and 5, the movable die assembly provides a knockout plate 15 that is mounted between the operating plate 4 and a plate 16 which carries the movable die 2, with a space 17 between the plates 15 and 16 when the dies 1 and 2 are closed. The knockout plate 15 carries a number of pins 18 which extend freely through the plate 16 into the die 2 and the pins 18 are of such length that with the dies closed, the ends of the pins terminate short of the molding cavity 6. The knockout pins 18 are normally maintained in their retracted positions by springs 19 surrounding the pins between the plates 15 and 16, so that with the dies closed, the knockout plate 15 is yieldingly held in engagement with the operating plate 4.

Figure 6:
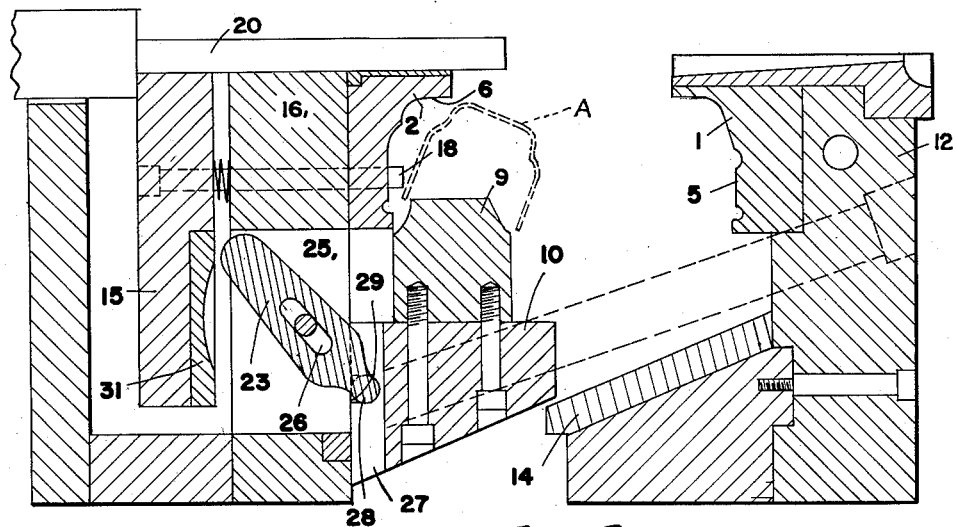
Fig. 6 is a sectional view similar to Fig. 5, with the dies in open position and showing the ejection of a molded article.

In order to operate the knockout pins 18 so as to cause ejection of the molded article, the knockout plate 15 is mounted on a rod 20 which is in alignment with the axis of the sprue-way 8, with the rod extending freely through an opening 21 in the operating plate 4 and projecting beyond the plate 4 in the direction of a fixed stop 22 that is spaced from the end of the rod 20, a predetermined distance, when the dies 1 and 2 are closed for the molding operation. This stop 22 is mounted on the frame of the machine, not shown, and the relation of parts is such that the knockout plate 15 will move with the operating plate 4 through a predetermined distance until the end of the rod engages the stop 22 as shown in Fig. 6. When this occurs, the knockout plate 15 is moved in the direction of the die plate 16, thereby compressing the springs 18 within the space 17 and causing the knockout pins to move into the molding cavity 6 to thereby eject the molded article A, as indicated in dotted lines.

As previously pointed out, the core 9 has been withdrawn from the molding cavity 6 due to the camming action of the inclined rods 11, so that there is ample clearance between the surface of the core 9 and the molding cavity 6 to permit ejection of the molded article A. It will be apparent however, from a consideration of Fig. 6 that when the dies 1 and 2 are again closed for the performance of the next molding operation, it is essential that the knockout pins 18 be withdrawn entirely from the molding cavity 6 before the core 9 is again positioned in operative relation thereto and to the cavity 5, as shown in Fig. 5. Otherwise, entry of the core 9 would shear off or jam the pins 18, thereby damaging the die 2 to the extent that it would no longer be usable.

As the closing of the dies 1 and 2 is started by movement of the operating plate 4 to the right from the position of Fig. 6, the compressed springs 19 tend to shift the knockout plate 15 to the left, since the outer end of the rod 20 is then free of the stop 22. Therefore, in the normal operation of the knockout mechanism, the pins 18 should be fully withdrawn from the molding cavity 6 by the time the core 9 enters the cavity to the point where it would engage the pins should the latter remain in the position of Fig. 6. However, experience has shown that continued use of the springs 19 under the high temperatures employed in injection molding frequently results in weakening or breaking of the springs, so that they fail to perform their intended function in withdrawing the knockout pins 18 from the molding cavity 6 with resulting damage to the die 2.

As previously pointed out, the object of the present invention is to provide an automatic safety mechanism which positively withdraws the knockout pins 18 from the molding cavity in advance of each entry of the core 9 into its normal position between the dies 1 and 2. The arrangement and functioning of this mechanism are best shown in Figs. 5, 6 and 7, in which the core 9 is shown in its extreme positions on the camming rods 11, as well as in an intermediate position which it occupies when the dies 1 and 2 are only partly closed.

The safety mechanism of the present invention comprises a lever 23 which is pivotally mounted on a fixed pin 24 so as to turn within a slot 25 provided in the movable die plate 16. It is to be noted that the pin 24 extends through an elongated slot provided in the lever 23, so that the lever is capable of lengthwise bodily movement, simultaneously with pivotal movement about the pin 24 which is fixed. When the dies 1 and 2 are closed, as shown in Fig. 5, one end of the lever 23 is received in a groove 27 extending lengthwise of the core block 10 and a pair of ears 28 projecting from the end of the lever are seated in a pair of notches 29 provided in the sides of the groove 27, which notches 29 are open at their ends to receive the ears 28, as shown in dotted lines in Fig. 7, and in full lines in Figs. 5 and 6.

By reason of the reception of the ears 28 in the notches 29, the right-hand end of the lever 23 is caused to move with the core block 10 as the latter is shifted from the position of Fig. 5 to the position of Fig. 6, thereby turning the lever 23 in a clockwise direction. When the core 9 has reached its extreme withdrawn position with reference to the molding cavity 6, the left-hand end of the lever 23 will then be in such a position that it will no longer project beyond the slot 25 in the die plate 16. Therefore, the knockout plate 15 is free to move toward the die plate 16 when the rod 20 engages the stop 22, in which position the knockout pins 18 are projected into the molding cavity 6 a sufficient distance to eject the molded article A, as indicated.

Figure 7:
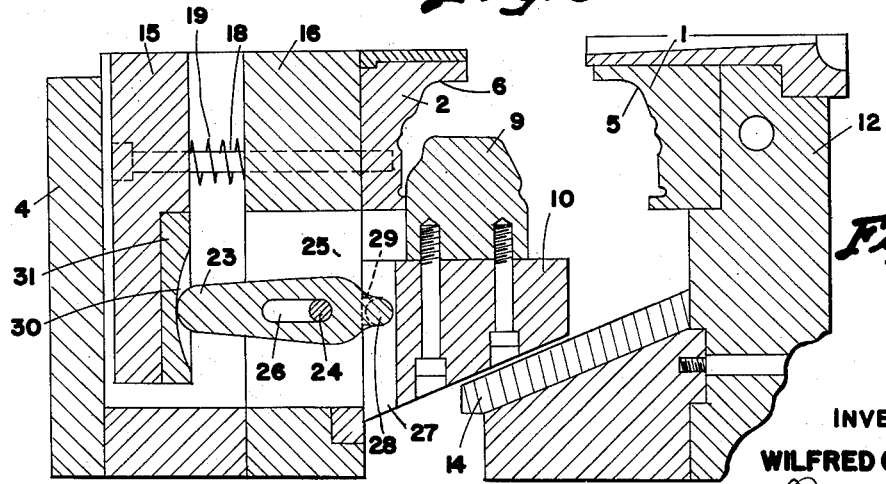
Fig. 7 is a sectional view similar to Fig. 5 illustrating the automatic withdrawal of the knockout pins in advance of the closure of the dies and the reentry of the core into the molding cavity.

Referring now to Fig. 7, it will be seen that when dies 1 and 2 start to close, the resulting inward movement of the core block 10 on the rods 11, will turn the lever 23 into a position in which its axis is substantially at right angles to the parting line between the dies 1 and 2. When this occurs, the outer end of the lever 23 is projected into the space 17 between the plates 15 and 16 due to the fact that the fixed pivot pin 24 and the ears 28 are then in alignment, with the slot 26 of the lever permitting lengthwise bodily movement of the lever in the direction of the knockout plate 15. Therefore, the knockout plate 15 will be forcibly moved toward the operating plate 4 to positively withdraw the knockout pins 18 from the molding cavity 6, before the core 9 can enter the cavity to the point where it might engage the knockout pins.

In order to prevent undue wear of the knockout plate 15 through its engagement by the lever 23, each time the dies are closed, the plate 15 provides a block 31 of wear-resistant material. This block 31 is formed with a concave seat 30 over which the end of the lever 23 moves during its turning movement to positively withdraw the knockout pins by engagement with the knockout plate 15, as previously described.

I claim:

1. A knockout mechanism for molding machine dies comprising in combination, a pair of dies providing cooperating molding cavities, means for moving one of said dies with respect to the other to separate said dies along a parting line, a core member operatively positioned in said cavities by the closing of said dies, and retracted therefrom away from contact with the molded article therein by said movement of separation, a knockout member associated with one of said dies for ejecting a molded article from the molding cavity thereof in response to the opening of said dies, and connections extending between said core member and said knockout member, responsive to initiation of said core member's return movement to operative position, for effecting withdrawal of said knockout member from the molding cavity of the associated die in advance of the entry of said core member into said molding cavity.

2. A knockout mechanism for molding machine dies comprising in combination, a pair of dies providing cooperating molding cavities, means for moving one of said dies with respect to the other to separate said dies along a parting line, a core member carried by said dies and operatively positioned in their cavities by the closing movement thereof, said core member being retracted from said cavities, away from contact with the article molded therein by said movement of separation, a knockout member movable within one of said dies for ejecting a molded article from the molding cavity thereof in response to the opening of said dies, means for moving said knockout member into said molding cavity following the opening of said dies and the withdrawal of said core member from the molding cavity, and connections extending between said core member and said last-named means, and responsive to initiation of said core member's return movement to operative position, for effecting withdrawal of said knockout member from said molding cavity in advance of the reentry of said core member therein.

3. A knockout mechanism for molding machine dies comprising in combination, a fixed die plate, a movable die plate, a pair of dies mounted on said plates and providing cooperating molding cavities when said dies are closed, a core member slidably mounted on the movable die plate for reception in said molding cavities when said dies are closed, with said core member being withdrawn from each article molded in said molding cavities in response to actuation of said movable plate to open the dies, a knockout member slidably mounted in the movable die plate, a knockout plate shiftable with respect to the movable die plate to project said knockout member into the molding cavity of the movable die, and connections extending between said core member and said knockout plate, responsive to initiation of said core member's return movement to operative position within said molding cavities, for moving said knockout plate away from said movable die plate to withdraw said knockout member from the molding cavity in advance of entry of said core member into the molding cavities of the closed dies.

4. A knockout mechanism for molding machine dies comprising in combination, a fixed die plate, a movable die plate, a pair of dies mounted on said plates and providing cooperating molding cavities when said dies are closed, a core member slidably mounted on the movable die plate for reception in said molding cavities when said dies are closed, with said core member being withdrawn from the molding cavities in response to actuation of said movable plate to open the dies, a knockout member slidably mounted in the movable die plate, a knockout plate shiftable with respect to the movable die plate to project said knockout member into the molding cavity of the movable die, a lever pivotally mounted on said movable die plate and extending between said core member and said knockout plate for shifting said knockout plate away from said movable die plate in response to movement of said core member toward said dies.

5. A knockout mechanism for molding machine dies comprising in combination, a fixed die plate, a movable die plate, a pair of dies mounted on said plates and providing cooperating molding cavities when said dies are closed, a core member slidably mounted on the movable die plate for reception in said molding cavities when said dies are closed, with said core member being withdrawn from the molding cavities in response to actuation of said movable plate to open the dies, a knockout member slidably mounted in the movable die plate, a knockout plate shiftable with respect to the movable die plate to project said knockout member into the molding cavity of the movable die and a lever pivotally mounted on said movable die plate with one end connected to said core member and its other end extending toward said knockout plate, with movement of said core member toward said dies serving to turn said lever and thereby shift said knockout plate away from the movable die plate to withdraw said knockout member from the molding cavity of the movable die.

References Cited in the file of this patent
UNITED STATES PATENTS

| | | |
|---|---|---|
| 2,253,651 | Ring | Aug. 26, 1941 |
| 2,358,857 | Gits | Sept. 26, 1944 |